United States Patent
Fu et al.

(10) Patent No.: US 11,740,374 B2
(45) Date of Patent: Aug. 29, 2023

(54) SYSTEM AND METHOD FOR RANDOMNESS MEASUREMENT IN SESIMIC IMAGE DATA USING VECTORIZED DISORDER ALGORITHM

(71) Applicant: Saudi Arabian Oil Company, Dhahran (SA)

(72) Inventors: Qiang Fu, Dhahran (SA); Saleh A. Dossary, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 180 days.

(21) Appl. No.: 17/305,129

(22) Filed: Jun. 30, 2021

(65) Prior Publication Data
US 2023/0013472 A1    Jan. 19, 2023

(51) Int. Cl.
*G01V 1/34*   (2006.01)
*G01V 1/00*   (2006.01)
*G01V 1/28*   (2006.01)

(52) U.S. Cl.
CPC .............. *G01V 1/345* (2013.01); *G01V 1/005* (2013.01); *G01V 1/282* (2013.01); *G01V 2210/1234* (2013.01)

(58) Field of Classification Search
CPC ........ G01V 1/345; G01V 1/005; G01V 1/282; G01V 2210/1234
See application file for complete search history.

(56) References Cited

U.S. PATENT DOCUMENTS

| | | |
|---|---|---|
| 6,226,596 B1 | 5/2001 | Gao |
| 3,027,517 A1 | 9/2011 | Gauthier et al. |
| 2006/0269139 A1 | 11/2006 | Keskes et al. |

(Continued)

FOREIGN PATENT DOCUMENTS

| | | |
|---|---|---|
| CN | 102707315 B | 7/2014 |
| WO | 2017106220 A1 | 6/2017 |

OTHER PUBLICATIONS

Meldahl, Paul, et al. "Identifying faults and gas chimneys using multiattributes and neural networks." The leading edge 20.5 (2001): 474-482.

(Continued)

*Primary Examiner* — Daniel Pihulic
(74) *Attorney, Agent, or Firm* — Leason Ellis LLP

(57) ABSTRACT

Systems and methods are disclosed for hydrocarbon exploration using seismic imaging and, more specifically, measuring randomness in seismic data utilizing a vectorized disorder algorithm. The vectorized disorder algorithm is configured to measure the randomness level (e.g., noise) in seismic data to improve seismic data processing/imaging and the ability to expose subsurface geology. The vectorized disorder algorithm includes performing convolution of seismic data with a vectorized disorder operator having an extra dimension than the seismic data. A nonlinear reduction operation is performed on the vectorized output to generate a randomness distribution dataset having the same dimension as the input data. The randomness distribution dataset comprises data points representing the level of randomness for respective seismic data points. A more accurate seismic image is generated from the seismic data as a function of the measured randomness distribution.

19 Claims, 7 Drawing Sheets

(56) References Cited

U.S. PATENT DOCUMENTS

| | | |
|---|---|---|
| 2012/0176861 A1 | 7/2012 | Abma et al. |
| 2020/0158899 A1* | 5/2020 | Li et al. |
| 2023/0013472 A1* | 1/2023 | Fu ............................ G01V 1/005 |
| 2023/0078067 A1* | 3/2023 | Fu ............................ G01V 1/301 |

OTHER PUBLICATIONS

Randen, Trygve et al., "Automatic extraction of fault surfaces from three-dimensional seismic data." SEG Technical Program Expanded Abstracts 2001. Society of Exploration Geophysicists, 2001. 551-554.

Hall, Stephen A. "A methodology for 7D warping and deformation monitoring using time-lapse seismic data." Geophysics 71.4 (2006): O21-O31.

Gauthier, Jérôme, and Laurent Duval "3D seismic data processing with complex non separable multidimensional lapped transforms." Poster session of Physics in Signal and Image Processing (PSIP'07). 2007.

Chopra, Satinder et al., "Understanding the seismic disorder attribute and its applications." The Leading Edge 35.8 (2016): 695-702.

Al-Dossary, Saleh et al., Estimating randomness using seismic disorder. Interpretation 2.1 (2014): SA93-SA97.

Aminzadeh, Fred, et al. "Geohazard detection and other applications of chimney cubes." The Leading Edge 21.7 (2002): 681-685.

Dash, Bibhu P et al., "Determination of signal and noise statistics using correlation theory." Geophysics 35.1 (1970): 24-32.

Immerkaer, John. "Fast noise variance estimation." Computer vision and image understanding 64.2 (1996): 300-302.

* cited by examiner $$VD_{2d} = \left\{ \begin{bmatrix} 1 & 0 & 0 \\ 0 & -2 & 0 \\ 0 & 0 & 1 \end{bmatrix}_1, \begin{bmatrix} 0 & 0 & 0 \\ 1 & -2 & 1 \\ 0 & 0 & 0 \end{bmatrix}_2, \begin{bmatrix} 0 & 0 & 1 \\ 0 & -2 & 0 \\ 1 & 0 & 0 \end{bmatrix}_3, \begin{bmatrix} 0 & 1 & 0 \\ 0 & -2 & 0 \\ 0 & 1 & 0 \end{bmatrix}_4 \right\}$$

FIG. 3A

$$VD_{3d} = \left\{ \begin{matrix} \left[\begin{smallmatrix}0&0&0\\0&0&0\\0&0&0\end{smallmatrix}\right]\left[\begin{smallmatrix}1&0&0\\0&-2&0\\0&0&1\end{smallmatrix}\right]\left[\begin{smallmatrix}0&0&0\\0&0&0\\0&0&0\end{smallmatrix}\right] \end{matrix}\right._1, \begin{matrix} \left[\begin{smallmatrix}0&0&0\\0&0&0\\0&0&0\end{smallmatrix}\right]\left[\begin{smallmatrix}0&1&0\\0&-2&0\\0&1&0\end{smallmatrix}\right]\left[\begin{smallmatrix}0&0&0\\0&0&0\\0&0&0\end{smallmatrix}\right] \end{matrix}_2, \begin{matrix} \left[\begin{smallmatrix}0&0&0\\0&0&0\\0&0&0\end{smallmatrix}\right]\left[\begin{smallmatrix}0&0&1\\0&-2&0\\1&0&0\end{smallmatrix}\right]\left[\begin{smallmatrix}0&0&0\\0&0&0\\0&0&0\end{smallmatrix}\right] \end{matrix}_3,$$

$$\begin{matrix} \left[\begin{smallmatrix}0&0&0\\0&0&0\\0&0&0\end{smallmatrix}\right]\left[\begin{smallmatrix}0&0&0\\1&-2&1\\0&0&0\end{smallmatrix}\right]\left[\begin{smallmatrix}0&0&0\\0&0&0\\0&0&0\end{smallmatrix}\right] \end{matrix}_4, \begin{matrix} \left[\begin{smallmatrix}1&0&0\\0&0&0\\0&0&0\end{smallmatrix}\right]\left[\begin{smallmatrix}0&0&0\\0&-2&0\\0&0&0\end{smallmatrix}\right]\left[\begin{smallmatrix}0&0&0\\0&0&0\\0&0&1\end{smallmatrix}\right] \end{matrix}_5, \begin{matrix} \left[\begin{smallmatrix}0&0&0\\1&0&0\\0&0&1\end{smallmatrix}\right]\left[\begin{smallmatrix}0&0&0\\0&-2&0\\0&0&0\end{smallmatrix}\right]\left[\begin{smallmatrix}0&0&0\\0&0&1\\0&0&0\end{smallmatrix}\right] \end{matrix}_6,$$

$$\begin{matrix} \left[\begin{smallmatrix}0&0&0\\0&0&0\\1&0&0\end{smallmatrix}\right]\left[\begin{smallmatrix}0&0&0\\0&-2&0\\0&0&0\end{smallmatrix}\right]\left[\begin{smallmatrix}0&0&1\\0&0&0\\0&0&0\end{smallmatrix}\right] \end{matrix}_7, \begin{matrix} \left[\begin{smallmatrix}0&1&0\\0&0&0\\0&0&0\end{smallmatrix}\right]\left[\begin{smallmatrix}0&0&0\\0&-2&0\\0&0&0\end{smallmatrix}\right]\left[\begin{smallmatrix}0&0&1\\0&0&0\\0&1&0\end{smallmatrix}\right] \end{matrix}_8, \begin{matrix} \left[\begin{smallmatrix}0&0&0\\0&1&0\\0&0&0\end{smallmatrix}\right]\left[\begin{smallmatrix}0&0&0\\0&-2&0\\0&0&0\end{smallmatrix}\right]\left[\begin{smallmatrix}0&0&0\\0&1&0\\0&0&0\end{smallmatrix}\right] \end{matrix}_9,$$

$$\begin{matrix} \left[\begin{smallmatrix}0&0&0\\0&0&0\\0&1&0\end{smallmatrix}\right]\left[\begin{smallmatrix}0&0&0\\0&-2&0\\0&0&0\end{smallmatrix}\right]\left[\begin{smallmatrix}0&1&0\\0&0&0\\0&0&0\end{smallmatrix}\right] \end{matrix}_{10}, \begin{matrix} \left[\begin{smallmatrix}0&0&1\\0&0&0\\0&0&0\end{smallmatrix}\right]\left[\begin{smallmatrix}0&0&0\\0&-2&0\\0&0&0\end{smallmatrix}\right]\left[\begin{smallmatrix}0&0&0\\0&0&0\\1&0&0\end{smallmatrix}\right] \end{matrix}_{11}, \begin{matrix} \left[\begin{smallmatrix}0&0&0\\0&0&1\\0&0&0\end{smallmatrix}\right]\left[\begin{smallmatrix}0&0&0\\0&-2&0\\0&0&0\end{smallmatrix}\right]\left[\begin{smallmatrix}0&0&0\\1&0&0\\0&0&0\end{smallmatrix}\right] \end{matrix}_{12},$$

$$\left. \begin{matrix} \left[\begin{smallmatrix}0&0&0\\0&0&0\\0&0&1\end{smallmatrix}\right]\left[\begin{smallmatrix}0&0&0\\0&-2&0\\0&0&0\end{smallmatrix}\right]\left[\begin{smallmatrix}1&0&0\\0&0&0\\0&0&0\end{smallmatrix}\right] \end{matrix}_{13} \right\}$$

SYSTEM AND METHOD FOR RANDOMNESS MEASUREMENT IN SESIMIC IMAGE DATA USING VECTORIZED DISORDER ALGORITHM

FIELD OF THE DISCLOSURE

The present disclosure relates to the fields of hydrocarbon exploration, development and production. In one particular arrangement, the present disclosure describes a implemented system and method for performing seismic exploration using a vectorized disorder algorithm for measuring the randomness level of seismic survey data in order to more accurately reveal geological features in the seismic data.

BACKGROUND OF THE DISCLOSURE

Seismic exploration may utilize a seismic energy source to generate acoustic signals that propagate into the earth and partially reflect off subsurface seismic reflectors (e.g., interfaces between subsurface layers). The reflected signals are recorded by sensors (e.g., receivers or geophones then send the signal to recording devices located in the seismic units) the recording units laid out in a seismic spread covering a region of the earth's surface. The recorded signals, seismic data, may then be processed to yield a seismic survey including seismic images.

SUMMARY OF THE DISCLOSURE

According to an aspect of the present disclosure, a method for seismic imaging of a subsurface region of the earth for hydrocarbon exploration, development, or production, the method is disclosed. The method comprises the steps of receiving into a processing system, a set of seismic data measured for the subsurface region. Measuring, by the processing system from the set of seismic data, a randomness attribute for respective data points in the set of seismic data.

In particular, the step for measuring the randomness attribute includes performing convolution of a vectorized disorder operator with the set of seismic data. More specifically, the seismic data has a first number of dimensions, wherein the vectorized operator has a second number of dimensions that is one greater than the first number of dimensions. Convolution of the seismic data and the vectorized disorder operator generates a vectorized output data set having an extra dimension, n. Additionally, the step for measuring the randomness attribute includes performing a dimension reduction operation on the vectorized output data set to generate a randomness distribution data set having the first number of dimensions. More specifically, the dimension reduction operation is a nonlinear mathematical operation.

The method further includes the step of generating, by the processing system, a processed seismic data set based on the set of seismic data and as a function of the randomness distribution data set.

According to a further aspect, a system for imaging of a subsurface region of the earth for hydrocarbon exploration, development, or production is disclosed. The system comprises a computing device including a non-transitory storage medium and an interface for receiving a set of seismic data measured for the subsurface region. In particular, the seismic data has a first number of dimensions. Additionally, the system includes a processor that is configured by executing code that is in the form of one or more modules stored in the non-transitory storage medium.

In particular, the one or more software modules configure the processor to measure, from the set of seismic data, a randomness attribute for respective data points in the set of seismic data. More specifically, the randomness attribute is measured by performing convolution of a vectorized disorder operator with the seismic data points. The vectorized operator has a second number of dimensions that is one greater than the first number of dimensions and convolution of the seismic data and the vectorized disorder operator generates a vectorized output data set having an extra dimension, n. Additionally, the randomness attribute is measured by performing a dimension reduction operation on the vectorized output data set to generate a randomness distribution data set having the first number of dimensions. The dimension reduction operation is a nonlinear mathematical operation.

Additionally, the one or more software modules configure the processor to generate a processed seismic data set based on the set of seismic data and as a function of the randomness distribution data set.

These and other aspects, features, and advantages can be appreciated from the accompanying description of certain embodiments of the disclosure and the accompanying drawing figures and claims.

BRIEF DESCRIPTION OF THE DRAWINGS

The foregoing and other features of the arrangements of the present disclosure will be more readily apparent from the following detailed description and drawings of an illustrative embodiment of an invention encompassed by the disclosure.

FIG. 3A is a matrix representation of an exemplary two-dimensional vectorized disorder operator for use in connection with the vectorized disorder algorithm according to the principles of the disclosure;

FIG. 3B is a matrix representation of an exemplary three-dimensional vectorized disorder operator for use in connection with the vectorized disorder algorithm according to the principles of the disclosure;

FIG. 5A is a mathematical representation of the combination of a disorder operator with a smooth operator according to the principles of the disclosure; and FIG. 5B is a mathematical representation of the combination of a disorder operator with a smooth operator according to the principles of the disclosure.

DESCRIPTION OF CERTAIN EMBODIMENTS OF THE DISCLOSURE

Figure 1A:
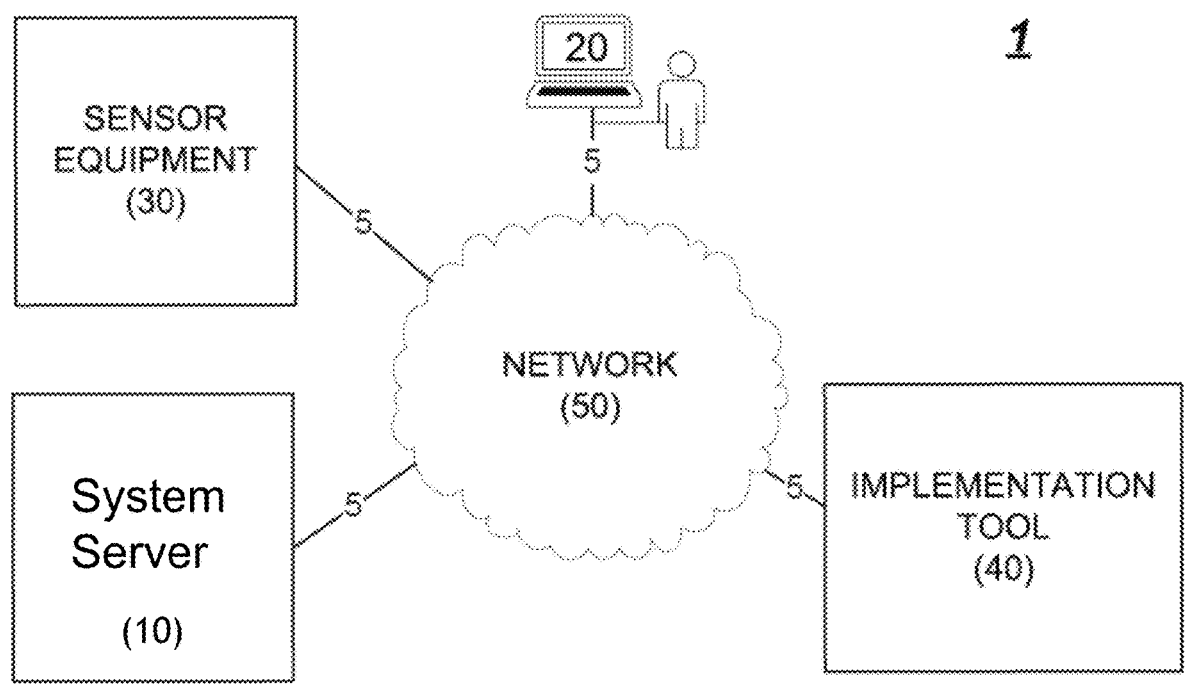
FIG. 1A shows an example of a system for seismic imaging of a subsurface region from seismic data that is processed using a vectorized disorder algorithm, according to the principles of the disclosure.

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment may be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure may be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

By way of overview and introduction, the present application describes a system and method for performing seismic imaging by processing seismic reflection survey data and, more specifically, implementing a vectorized disorder algorithm for quantitatively determining the degree of randomness embedded within seismic data using vectorized convolution.

Subsurface imaging and modelling can be implemented in hydrocarbon exploration, development or production. Subsurface images and models can be generated based on sensor data that includes, for example, seismic data that can be used to model physical properties in one or more subsurface regions of the earth to facilitate hydrocarbon exploration, development, or production. The subsurface models can represent subsurface regions, including structures, cavities, faults, volumes, areas, material properties, or fluid properties. The subsurface models can represent measured data or interpreted data for each subsurface region. The subsurface models can represent material or fluid properties such as, for example, temperature, pressure, density, porosity, permeability, fluid content, volume, flow rate, or viscosity in the subsurface regions. The subsurface models can include, for example, geological models or reservoir models. The subsurface images and resulting models can be employed in determining optimal placement of wells in the field.

Seismic data can be used to model a subsurface region and reconstruct or estimate material or fluid properties in the subsurface region. In seismic data processing, raw seismic data acquired during a survey may undergo a data interpretation process to obtain geological depth information, such as the seismic attributes for the region of interest. For instance, seismic inversion can include converting the data to a distribution of seismically-derived acoustic impedance over time or depth within the subsurface region. Acoustic impedance, which is a measure of the opposition of the flow of sound through a surface, can thus be used to interpret subterranean zones of interest, for example by estimating the location of subterranean boundaries and the thickness of a layer, zone, formation, reservoir, etc.

For finding the potential hydrocarbon deposits, geophysical exploration usually uses seismic reflection surveys to image and interpret subsurface structure. In seismic survey, seismic charges are used to emit artificial seismic waves into the ground travelling downward into the earth. The energy of the seismic wave bounced back from subsurface interfaces is recorded by sensor equipment including a number of seismic receivers, and the recorded seismic wave is referred to as seismic data. Underground structure information can be extracted by analyzing seismic data, and this process is referred to as seismic imaging.

During seismic data acquisition, the reflection signal is commonly interfered with, or includes random noises from a variety of environment and instrument sources. Furthermore, randomness can also generated by random reflection or refraction at geology features such as subsurface anomalies, fracture zones, gas chimneys, etc., and the noise is represented by randomness in seismic data. Therefore, randomness level measurement is not only an important tool for seismic data processing/imaging quality control (QC), but also can be an important indicator for locating some geology structures of potential hydrocarbon reservoirs.

Randomness level measurement is an important task in seismic data processing/imaging, which helps both to improve seismic processing/imaging quality control (QC) and to better expose geology structures, such as subsurface anomalies, fracture zones, gas chimneys and the like. A more accurate determination of the randomness level distribution of the seismic data can help a seismic exploration processor to generate a better subsequent processing and modelling workflow, provide more accurate information to instantly reveal critical geological features, which could lead to discoveries of new hydrocarbon reservoirs, more efficient production of existing ones, and increase the confidence of the final interpreters (e.g., users or automated implementation systems) when making implementation decisions from such seismic data/image, such as drilling decisions.

Various methods have been proposed for randomness measurement in seismic exploration. Dash and Obaidullah (1970) use cross correlation to describe data noise. That approach is similar to early coherence algorithms and doesn't work well in faulted areas because faults are accentuated over randomness. Randen et al. (2001) introduce the chaos attribute based on eigen-analysis of gradient covariance wherein high chaos values indicate low data directionality. Similar to eigen-coherence, this method is used mainly for fault extraction rather than noise description. In zones near fault planes, seismic data are discontinuous in one direction and continuous in other directions. Faults may also be associated with fracture zones; thus, local randomness measures can be useful for identifying fracture zones. However, both the Dash and Obaidullah (1970) and Randen et al. (2001) methods are ill suited for distinguishing faults from data randomness.

Al-Dossary et al. (2013) proposed the "Disorder Algorithm" for measuring randomness of seismic data (e.g., a seismic attribute, also referred to as Disorder Attribute) by using an optimized Immerkaer operator (Immerkaer, 1996) to remove the energy corresponding to regular structures along axial directions and then to extract the random energy distribution on 2D or 3D seismic data. The Disorder algorithm is proved to be a mathematically optimized algorithm under its assumption (i.e., no regular structure existing along any diagonal direction). This algorithm historically has been considered one of the more satisfactory methods and is widely used in seismic exploration practice. However, this algorithm still has two major flaws: First, the algorithm is not isotropic; if there is large amount of regular structures along diagonal direction, the Disorder Attribute will not be able to remove them, and therefore, it will provide falsely much higher randomness estimation. Also, the Disorder Algorithm will give different randomness distribution estimations when the input data is simply rotated by 45 degrees. Secondly, the estimated randomness distribution result from the Disorder Algorithm cannot be smoothed. In real production it is preferable to have a smooth estimation of distribution for randomness, however, the Disorder Algorithm will yield problematic results after smoothing.

More specifically, the Disorder Algorithm (Al-Dossary et al., 2013) uses convolutional filtering approach based Immerkaer operator (Immerkaer, 1996) to remove the energy of regular structures along axial directions in the input data, such as constant values, constant slopes, and steps. After removal energy of regular structures, the energy corresponding to random noises or random signals is extracted from the input data. As noted, the Disorder Attribute has two major flaws: 1) is An-isotropic; and 2) is Non-smoothable. The following discussion illustrates where these two flaws of the Disorder Algorithm (seismic attribute) come from in a 2D case, for sake of simplicity. It should be understood that the flaws in the 3D case are the same.

Background—Flaw 1: An-Isotropic

Al-Dossary et al. (2013) proved from the symmetry, a arbitrary 2D Immerkaer operator should have the form of $$\begin{bmatrix} c & b & c \\ b & 4 & b \\ c & b & c \end{bmatrix}, \quad (1)$$

where b and c are coefficients to be determined, and they cannot be all zeros.

To remove regular structures in the data, the sum of coefficients of any directions (along column, raw and diagonal) of the operator need to be 0, so a linear system can be represented as:

$$\begin{cases} 4 + 2b = 0 \\ b + 2c = 0. \\ 4 + 2c = 0 \end{cases} \quad (2)$$

From linear equations theory, it is apparent that these equations are impossible to solve (except an all zeros solution, which is meaningless in practical scenarios). The reason is there are only two unknowns and it is necessary to satisfy three equations (constraints), thus the system is overdetermined. To avoid this insolvable overdetermined system, the Disorder Attribute compromises by dropping one equation. By assuming the data only contains regular structures along axial directions, the Disorder operator only requires the sum of its coefficients of any axial directions to be 0, but not the diagonal direction. Then the system becomes:

$$\begin{cases} 4 + 2b = 0 \\ b + 2c = 0 \end{cases}. \quad (3)$$

By solving the above equations, the 2D Disorder operator is:

$$\begin{bmatrix} 1 & -2 & 1 \\ -2 & 4 & -2 \\ 1 & -2 & 1 \end{bmatrix}. \quad (4)$$

This assumption is more or less reasonable in geophysical exploration using seismic data, given the relatively low probability of appearance of steep structures, but it is not always to be true.

It is readily apparent that Disorder operator is anisotropic. The sums along row and column directions are 0, but are not 0 along diagonal directions. The consequence of this anisotropy is: if there is large amount of regular structures along diagonal direction, the Disorder Algorithm will not be able to remove them and therefor will provide falsely much higher randomness estimation. Also, the Disorder Attribute will give different randomness distribution estimations when the input section is simply rotated by 45 degrees.

Background—Flaw 2: Non-Smoothable

The Disorder Algorithm is based on convolutional filtering approach, and it is a linear operation represented as:

$$d \odot f = r \quad (5)$$

where d is the input data, $\odot$ is the convolution operation, f is the Disorder operator, and r is the randomness distribution estimation result.

A smooth randomness distribution estimation is preferable to avoid the impact from a few wild extreme values in the data. So, the Disorder result r is usually smoothed by applying another linear smoothen operator s to provide a smoothed randomness distribution $r_s$:

$$r \odot s = r_s. \quad (6)$$

From linear operator theory, the convolution operation is commutable, $$(a \odot b) \odot c = a \odot (b \odot c), \quad (7)$$

therefore, we have $$r_s = r \odot s = (d \odot f) \odot s = d \odot (f \odot s). \quad (8)$$

Figures 5A, 5B:
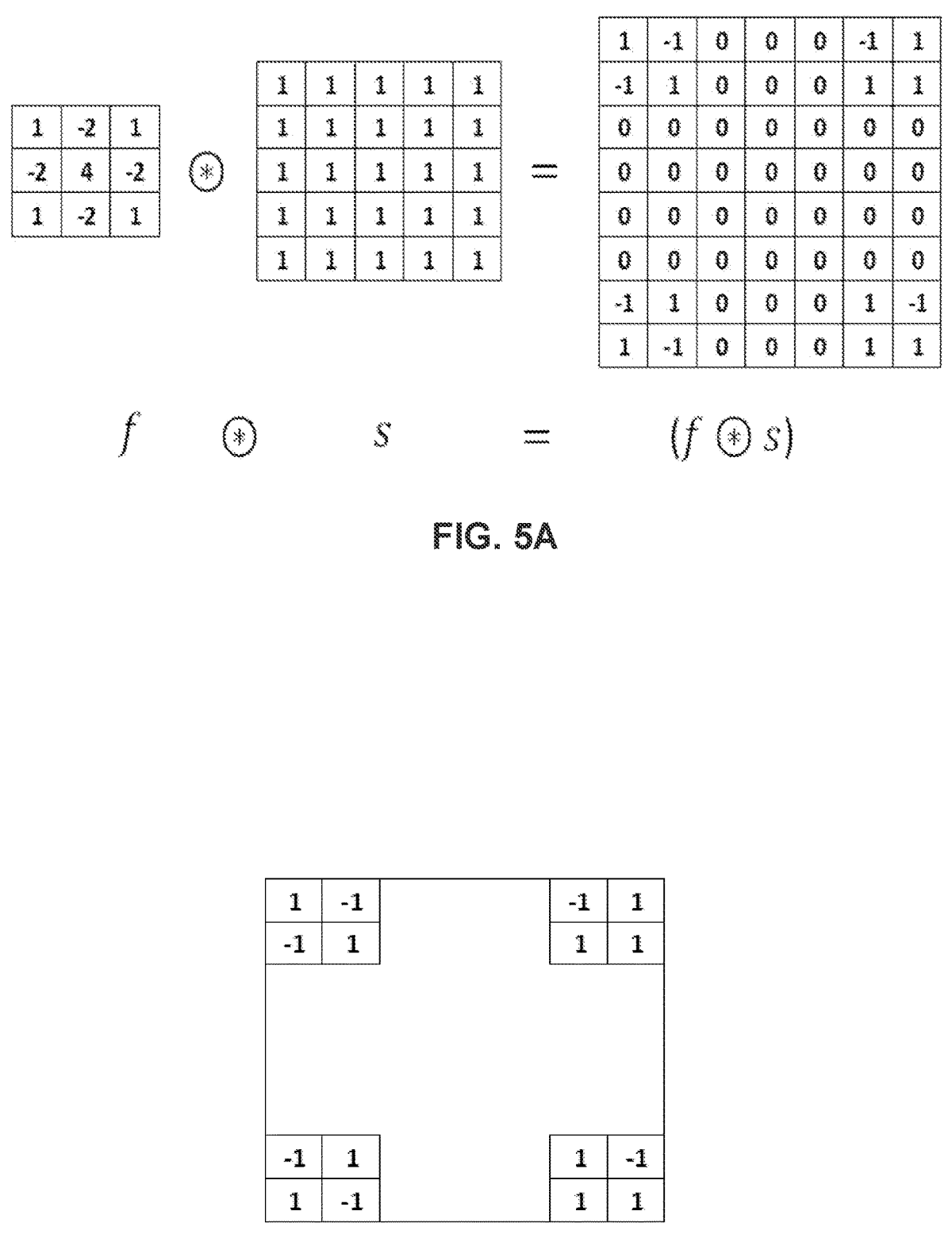

The smoothed randomness distribution $r_s$ is equal to applying a resultant operator $(f \odot s)$ on the input data d. Without loss of generality, a 5-point boxcar smoother can be used for s, the resultant operator, which is the combination of Disorder operator with the smooth operator $(f \odot s)$, is shown in FIG. 5A.

As can be appreciated combining the Disorder and smooth operators, the resultant operator is equal to splitting the Disorder operator into four pieces and then stretching them into its four corners as shown in FIG.

The consequence of this undesirable resultant operator is that, now, the input data for the operator are not from the vicinity of the output location anymore, so that the resultant "smoothed randomness distribution" operator is not local, thus it is not meaningful or useful. The foregoing is a reason why the Disorder Attribute is non-smoothable.

Disclosed embodiments of a system and method for processing seismic reflection survey data and quantitatively estimating the randomness distribution are configured to implement a Vectorized Disorder Algorithm (seismic attribute) for measuring the degree of randomness embedded in seismic data/image with increased accuracy and reliability. Embodiments of the vectorized disorder measurement algorithm have high capability to measure randomness, overcome the flaws of the conventional Disorder Algorithm, and are highly efficient to parallelize running on modern multi-processor computer/multi-node cluster. In addition, the vector nature of the vectorized disorder helps high performance implementation on modern CPU or GPU based computer/cluster. For clarity, the "seismic attribute" measured/generated using the Vectorized Disorder Algorithm is the amount of randomness that is respectively measured for each seismic datapoint in the multi-dimensional seismic dataset using the VDA. It should also be understood that the Vectorized Disorder Algorithm can similarly be used to measure randomness of various types of seismic data (e.g., raw reflection data, derived acoustic impedance data or others types of raw or derived seismic data and images). Additionally, the application of the Vectorized Disorder Algorithm to seismic data is a non-limiting example as the VDA can similarly be used to measure randomness of other types of measured data and/or images (e.g., non-seismic data/images or non-geophysical data/images).

Embodiments of the Vectorized Disorder Algorithm, and the resultant seismic attribute it is used to measure, overcome the aforementioned flaws of the existing Disorder Algorithm and achieve an isometric and smooth randomness estimation. Comparing algorithms currently used in production for same purpose (e.g., Disorder Algorithm), the Vectorized Disorder Algorithm (VDA) provides a more desirable (e.g., a much more isotropic and smoother) randomness distribution estimation. Test results on exploration field seismic data also confirms that performance of the VDA is superior to the current Disorder Algorithm.

Figure 1B:
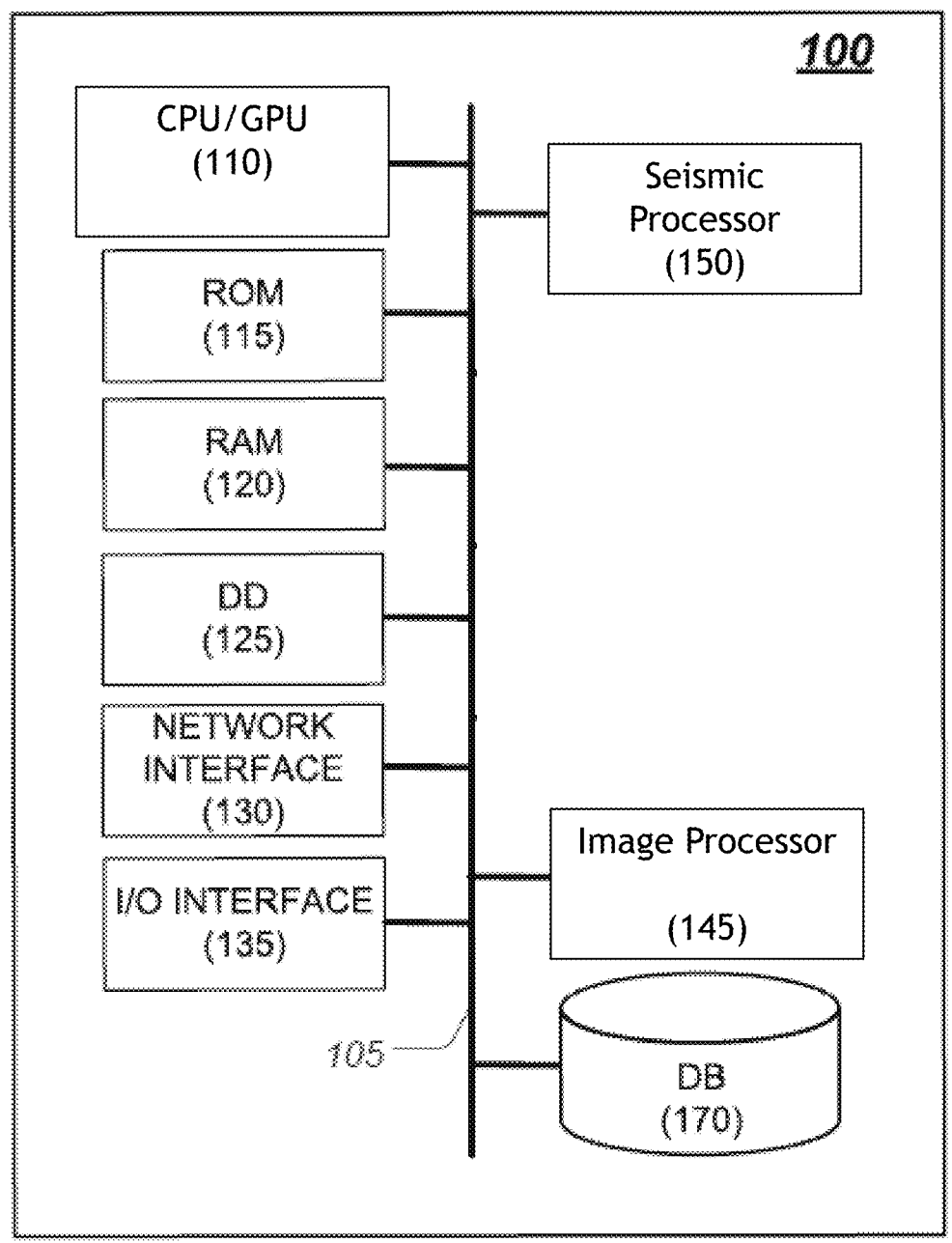
FIG. 1B shows an example of a seismic imaging processor used in the system of FIG. 1A according to the principles of the disclosure.

FIG. 1A shows an example of a system 1 for seismic imaging of a subsurface region of the earth by, inter alia, measuring randomness in seismic data utilizing the VDA, constructed according to the principles of the disclosure. FIG. 1B shows a non-limiting embodiment of a processor 100 that can be included in the server 10 (shown in FIG. 1A) and configured to implement the VDA to process the seismic data captured using the system 1. FIG. 1C is a conceptual system and process diagram illustrating elements and operations of an exemplary VDA process implemented by the processor 100. As shown in FIG. 1A, the seismic imaging system 1 includes a server 10 and a communicating device 20. The system 1 can also include sensor equipment 30, an implementation tool 40, or a network 50. The various components in the system 1 can be communicatively coupled to each other directly via communication links 5, or via communication links 5 and the network 50.

The server 10 can include a processor 100 (shown in FIG. 1B). The server 10 can receive sensor data directly or via the network 50 from land or marine seismic surveys that can be carried out using the sensor equipment 30. The received sensor data can include seismic data and other available data that is usable to model a subsurface region. The received sensor data can include raw pre-stack seismic data or pre-processed data. The received sensor data can include one-dimensional (1D) two-dimensional (2D) data, or three-dimensional (3D) data. For example, in an embodiment, 1D sensor data points (e.g., intensity values) are measured over a 2D or 3D area/volume so as to provide a 2D or 3D seismic dataset for processing using the server 10 according to the VDA.

The server 10 can generate a seismic images or models based on the sensor data, which can include raw pre-stack seismic data or processed seismic data, and information derived therefrom. The server 10 can identify geologic features based on the seismic images, sensor data and information derived therefrom. The server 10 can estimate one or more physical properties, such as, for example, porosity, permeability, density, temperature, pressure, viscosity, fluid content, fluid saturation, or flow rate in a target subsurface region. In addition, based on the foregoing determinations, the server 10 can also identify locations within the subsurface region for further exploration and/or extraction of natural resources.

The sensor equipment 30 can include transducer devices (not shown) that can generate and emit signals, including, for example, seismic waves, and/or receive reflected signals from a target area to form an image (for example, a seismic image) of the target area. Each transducer device (not shown) can include an energy source (for example, an explosive charge, a sonic pulse generator and transmitter) and a receiver (for example, a seismic receiver or a sonic signal receiver). The sensor equipment 30 can include, for example, geophones, seismometers, or other wave energy emitting and sensing devices. The sensor equipment 30 can include arrays of such emitters transmitters or receivers.

The implementation tool 40 can include, for example, a drilling rig (not shown) or wellbore casing installation equipment (not shown) for drilling or casing boreholes. The implementation tool 40 can be fully automated and operate under the control of the server 10. The implementation tool can also be configured to include human control. The implementation tool 40 can be positioned at a geographic location based on coordinates determined by the server 10.

FIG. 1B shows an example of the processor 100, constructed according to the principles of the disclosure. The processor 100 can receive sensor data $d(x_1, \ldots, x_k)$ measured for a 2D or 3D subsurface region. As can be understood, the input seismic data/image can be pre-processed according to various conventional or unconventional seismic data acquisition, processing and imaging steps used in a seismic exploration production workflow.

The sensor data can be received or transmitted over the communication link 5 (shown in FIG. 1A). The processor 100 can carry out various seismic imaging and sensor data processing operations including an exemplary process shown in FIG. 2 for estimating randomness in the input sensor data using the Vectorized Disorder Algorithm. As further described herein, the Vectorized Disorder algorithm (seismic attribute) for randomness in seismic data/image can be applied on any size seismic data/image of a 3D volume or a 2D slice.

FIG. 1B shows a non-limiting embodiment of the modelling processor 100 that can be included in the server 10 (shown in FIG. 1A). As seen in FIG. 1B, the processor 100 can include a computer processor 110 such as a computer processing unit (CPU), a read-only memory (ROM) 115, a random-access memory (RAM) 120, a disk drive (DD) 125, a network interface 130, an input/output (I/O) interface 135, a seismic processor 150, an image processor driver 145, and a database (DB) 170. The various components in the processor 110 can be connected to a bus 105 via one or more communication links. The processor 100 can receive the sensor data (e.g., $d(x_1, \ldots, x_k)$ via, for example, the network interface 130, I/O interface 135, DD 125, or the DB 170.

The system bus 105 can be any of several types of bus structures that can further interconnect to a memory bus (with or without a memory controller), a peripheral bus, and a local bus using any of a variety of commercially available bus architectures.

The CPU 110 can be any of various commercially available processors. Dual microprocessors and other multiprocessor architectures can also be employed as the CPU 110. The CPU 110 can also be a graphics processing unit (GPU).

The processor 100 includes a computer-readable medium that can hold executable or interpretable computer code (or instructions) that, when executed by the CPU 110, cause the described steps, processes and methods to be carried out. The computer-readable medium can be provided in the ROM 115, RAM 120, DD 125, DB 170, or an external computer-readable medium connected to the processor 100 via the network interface 130 or the I/O interface 135. The computer readable medium can include functional modules, for instance, sections of computer code that, when executed by the CPU 110 cause the steps of workflow (e.g., operations illustrated in FIG. 1C) to be carried out, and all other process steps described or contemplated in the description.

A basic input/output system (BIOS) can be stored in a non-volatile memory in the processor 100, such as, for example, the ROM 115. The ROM 115 can include a ROM, an erasable programmable read-only memory (EPROM), or an electrically erasable programmable read-only memory (EEPROM). The BIOS can contain the basic routines that help to transfer information between components within the processor 100, such as during start-up. The RAM 120 can include a high-speed RAM such as static RAM for caching data.

The disk drive (DD) 125 can include a hard drive, such as, for example, an enhanced integrated drive electronics (EIDE) drive, or a serial advanced technology attachments (SATA) drive. The DD 125 can include an optical disk drive that can read/write from/to a compact disk read-only memory (CD-ROM) disk (not shown), or read from or write to other high capacity optical media such as a digital video disk (DVD). The DD 125 can be configured for external use in a suitable chassis (not shown). The DD 125 can be connected to the system bus 105 by a hard disk drive interface (not shown) and an optical drive interface (not shown), respectively. The hard disk drive interface (not shown) can include a Universal Serial Bus (USB) (not shown) or an IEEE 1394 interface (not shown) for external applications.

The DD 125 and associated computer-readable media can provide nonvolatile storage of data, data structures, or computer-executable instructions. The DD 125 can accommodate the storage of any data in a suitable digital format. The DD 125 can include one or more apps that are used to execute aspects of the architecture described in this specification.

A number of program modules can be stored in the DD 125, ROM 115, or RAM 120, including an operating system (not shown), one or more application programs (not shown), other program modules (not shown), and program data (not shown). Any (or all) of the operating system, application programs, program modules, and program data can be cached in the RAM 120 as executable sections of computer code.

The network interface 130 can be connected to the network 50 (shown in FIG. 1A). The network interface 130 can include a wired or a wireless communication network interface (not shown) or a modem (not shown). When used in a local area network (LAN), the processor 100 can be connected to the LAN network through the wired or wireless communication network interface; and, when used in a wide area network (WAN), the processor 100 can be connected to the WAN network through the modem. The modem (not shown) can be internal or external and wired or wireless. The modem can be connected to the system bus 105 via, for example, a serial port interface (not shown).

The I/O interface 135 can receive commands and data from an operator via a user interface device (not shown), such as, for example, a keyboard (not shown), a mouse (not shown), a pointer (not shown), a microphone (not shown), a speaker (not shown), or a display (not shown). The received commands and data can be forward to the CPU 110 from the I/O interface 135 as instruction and data signals via the bus 105.

The image processor/driver 145 can include an image processing device, graphics driver (not shown), a video adaptor (not shown), or any other device necessary to process, generate and render an image signal on a display device, such as, for example a display device of the I/O interface 135 or the display device in the communicating device 20 (shown in FIG. 1A).

As further shown in FIG. 1B, the processor 100 can include a seismic processor 150. It should be understood that one or more of the seismic processor 150, image processor 145 and other such hardware and/or software-based processing modules can be integrated with the CPU 110 or provided separately, as seen in FIG. 1B. Furthermore, the seismic processor 150 other such modules can be in the form of instructions stored on one of the computer readable storage mediums and executable in the CPU.

Figure 2:
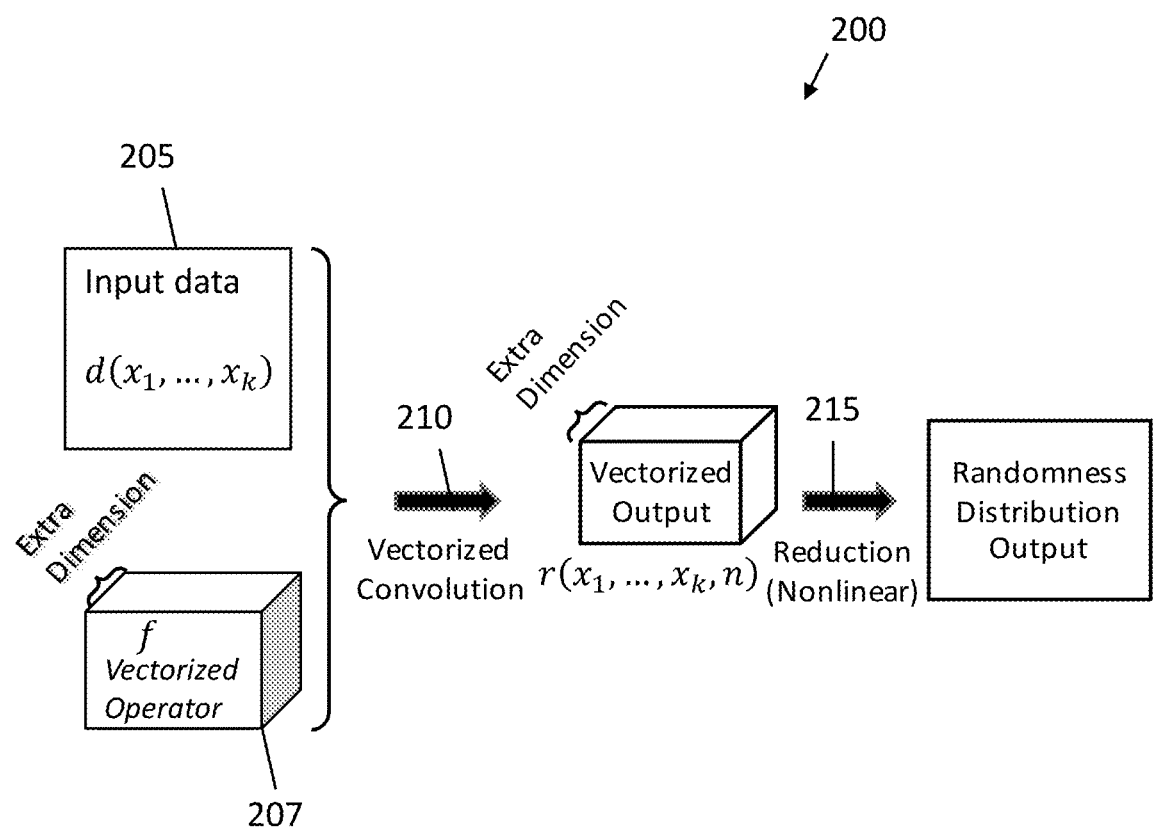
FIG. 2 is a conceptual block diagram illustrating an exemplary routine for measuring the randomness distribution from seismic data using a vectorized disorder algorithm according to the principles of the disclosure.

FIG. 2 is a hybrid conceptual system and process flow diagram illustrating a workflow 200 for implementing the Vectorized Disorder Algorithm to measure randomness in seismic data in accordance with one or more of the disclosed embodiments. One or more steps of the routine 200 can be performed by the processor 100 of the system 1 and, more particularly, the seismic processor 150 for example.

Figure 4A:
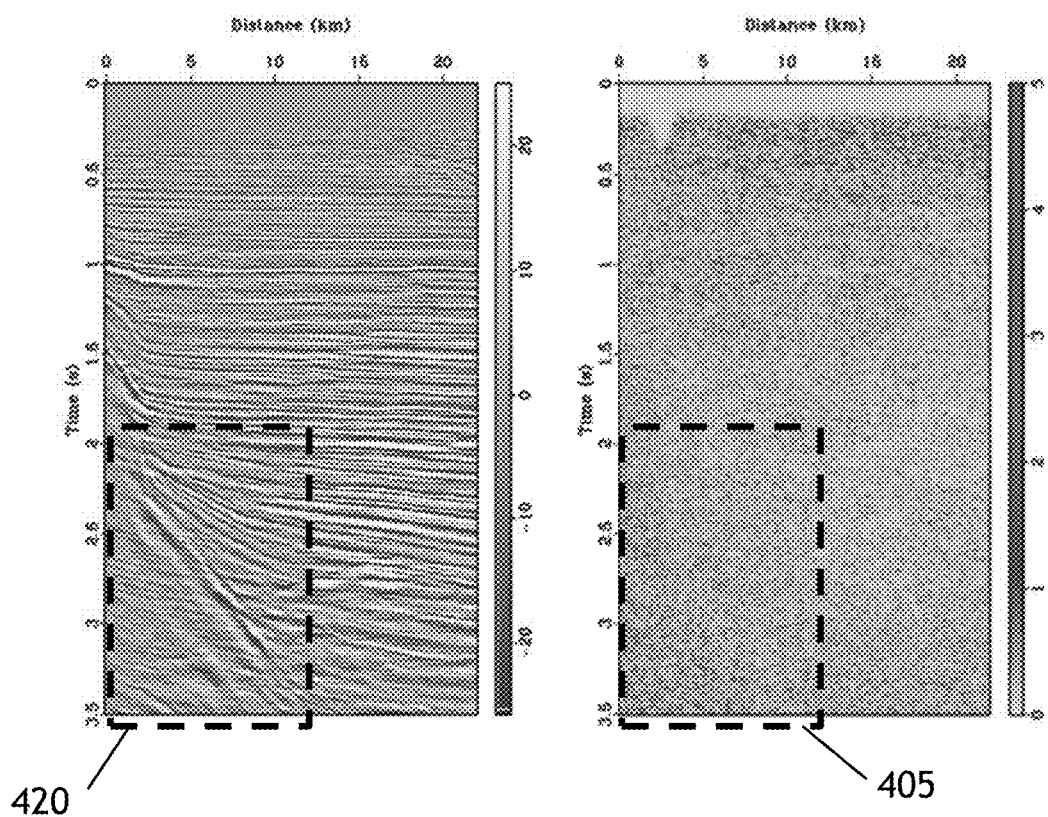
FIG. 4A is a graphical illustration of seismic input data and the corresponding randomness distribution output generated using a conventional disorder algorithm.

At step 205, the input seismic data/image is received at the processor 100. As should be understood, the input seismic data/image can include data points representing a 3D volume or a 2D slice of a subterranean region of interest. The input data can be pre-processed according to various conventional or unconventional seismic data acquisition, processing and imaging steps used in a seismic exploration production workflow. The left-side image of FIG. 4A illustrates an example seismic input data set, in particular, a seismic image showing a 2D slice of data.

Then at step 210, the seismic processor 150 performs Vectorized Convolution on the input seismic data, d. In particular, Vectorized Convolution includes performing convolution of input data, d, with a Vectorized Disorder operator which has an extra dimension than the input data. For instance, for a 2D input data set, the Vectorized Disorder operator has three (3) dimensions.

The VDA is based on vectorized convolution rather than the conventional linear convolution. By exploiting this technique, the VDA introduces an extra dimension (degree of freedom) and nonlinearity into the scheme. These two properties address both the overdetermined equation issue and non-local smoothed operator flaws of the conventional Disorder Algorithm, as further explained herein.

By way of background, the workflow of the conventional Disorder Algorithm (seismic attribute) exploits the conventional linear convolution $\odot$ defined as:

$$d(x_1, \ldots, x_k) \odot f(x_1, \ldots, x_k) = \Sigma_{i_1} \ldots \Sigma_{i_k} d(i_1, \ldots, i_k) * f(x_1-i_1, \ldots, x_k-i_k) = r(x_1, \ldots, x_k) \quad (9),$$

where d is the input data, $\odot$ is the convolution operation, filter f is the Disorder operator, and r is the randomness distribution estimation result.

The Vectorized Disorder Algorithm extends the conventional convolution ($\odot$) by adding one more extra dimension n. The vectorized convolution $\odot_{vec}$ is defined as:

$$d(x_1, \ldots, x_k) \odot_{vec} f(x_1, \ldots, x_k, n) = \Sigma_{i_1} \ldots \Sigma_{i_k} d(i_1, \ldots, i_k) * f(x_1-i_1, \ldots, x_k-i_k, n) = r(x_1, \ldots, x_k, n) \quad (10).$$

The filter f in the vectorized convolution $\odot_{vec}$ does not have the same number of dimensions as input data d, rather, f has an extra dimension n (i.e., one greater dimension than the number of dimensions of the input data d). As such, the output r also has this extra dimension n. Put another way, the result of step 210 is a Vectorized Output data set having an extra dimension than the dimension of the input data. For example, as shown conceptually/graphically and mathematically in FIG. 2 a two-dimensional (2D) input data set becomes a three-dimensional (3D) Vectorized Output data set, $r(x_1, \ldots, x_k, n)$.

Exemplary coefficients of the Vectorized Disorder operator, f, are briefly discussed next with reference to FIGS.

3A-3B. As noted, an extra dimension is introduced in the Vectorized Disorder operator that is convolved with the input data set to produce the Vectorized Output data set. In an embodiment, for each component of this extra dimension, a complete independent operator is provided in the same dimension as the input data, so that each of the independent operator can be assigned specifically to deal with certain regular structures in one single direction. FIG. 3A shows all the exemplary coefficients of 2D Vectorized Disorder operator, $VD_{2D}$, which has 4 components. FIG. 3B shows all the coefficients of 3D Vectorized Disorder operator, $VD_{3D}$, which has 13 components. Each component in the 2D or 3D operator is an individual conventional operator dedicated to structures of one single direction.

The operator(s) f used in the high dimensional (i.e., expanded with extra dimensions) convolution step (e.g., step 210 in FIG. 2) is shown in FIG. 2 as being provided at step 207. The vectorized (higher dimension) convolution approach of the VDA is nonlinear, in contrast to the conventional Disorder Algorithm which is linear. The design purpose of this is to remove the energy corresponding to regular structures along axial directions (such as constant values, constant slopes, and steps) and then to extract the random energy distribution on 2D or 3D seismic data. Put another way, by removing the energy from regular patterns, the remaining energy is the irregular part, which is randomness. From the linear operator theory, there is no operator of the same dimension as the input data that can remove the regular energy in horizontal, vertical, and diagonal patterns in the same time. By contrast, use of the high dimensional operator in the VDA can remove the regular energy in horizontal, vertical, and diagonal patterns in the same time. Another benefit for the high dimension operator is that it is nonlinear, thus the result can be smoothed. The specific values for all coefficients of the operator provided (e.g., $VD_{2D}$ and $VD_{3D}$ of FIG. 3A-3B) can be designed through mathematic optimization to achieve the aforementioned goal of removing the regular energy in horizontal, vertical and diagonal patterns. Accordingly, the operator of the VDA is not limited to the specific values for the coefficients shown in FIGS. 3A-3B and different sets of values can be derived for the coefficients depending on application requirements.

Returning now to FIG. 2, at step 215 a dimension reduction operation is performed on the Vectorized Output data to "collapse" the Vectorized Output result back into the same number of dimensions as the input data, d. For instance, given input data comprising a 2D slice, the Randomness Distribution output similarly represents the 2D slice. The result of the reduction step 215 is the Randomness Distribution Output, s. The Randomness Distribution Output data set $s(x_1, \ldots, x_k)$ (i.e., Vectorized Disorder Attribute) comprises data points/values representing the level of randomness estimated for respective seismic data points in the input data $d(x_1, \ldots, x_k)$. Preferably the reduction operation is a nonlinear mathematical operation. Accordingly, the Randomness Distribution Output is not commutable with any further conventional linear convolution afterward thus solving the non-smoothable issue of the conventional Disorder Algorithm.

More specifically, because the Vectorized Disorder Algorithm is based on vectorized convolution rather than the conventional linear convolution, the output of the operator has higher dimension (degree of freedom) than the input data. Preferably, the final result, namely, the set of Randomness Distribution Output values determined for respective data points, has the same dimension as the input data. As such, the reduction step is necessary to reduce the extra dimension and provide the result in a physical configuration that is the same as the input data. If any component corresponding to certain specific direction has regular structure energy, the randomness of this local area should be low.

In an embodiment, a minimum function applied over the data points of the Vectorized Output in the extra dimension, n, is used as the reduction function. For instance, the final result s after the reduction step is:

$$s(x_1, \ldots, x_k) = \min_n (d(x_1, \ldots, x_k) \circledast f(x_1, \ldots, x_k, n)) = \min_n (r(x_1, \ldots, x_k, n)) \quad (11)$$

Figure 4B:
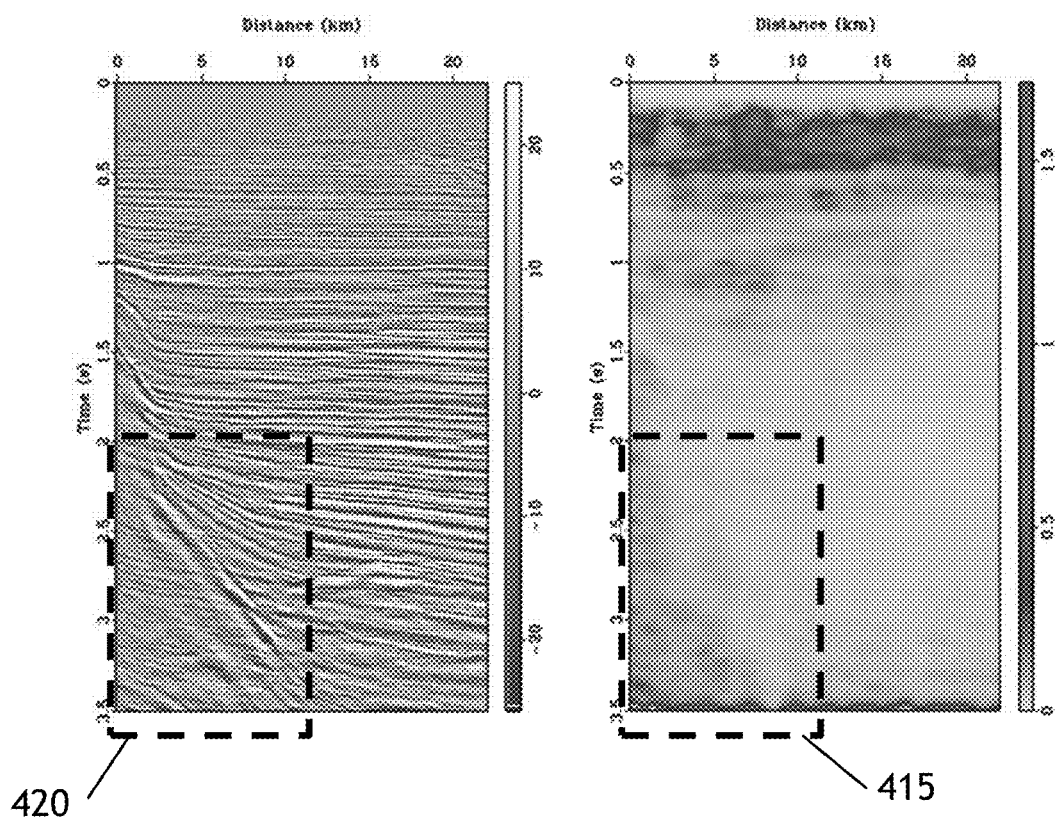
FIG. 4B is a graphical illustration of seismic input data and the corresponding randomness distribution output generated using a the vectorized disorder algorithm according to the principles of the disclosure.

FIG. 4A is a graphical visualization of a set of input seismic data points (left) and a visualization of the randomness estimation result for those data points determined using the Disorder Algorithm (right). FIG. 4B includes a graphical visualization of the same input seismic data (left) and a visualization of the corresponding randomness distribution result (right) calculated by the processor 100 using the Disorder Algorithm. The input seismic data (left) is represented graphically in the exemplary seismic image as a function of time on the x axis and distance on the y axis and the shading represents the intensity at a respective time and distance on a scale. The greyscale bar explains the mapping between the intensity value and the corresponding greyscale shading shown in the image. The randomness distribution result images (right) similarly show the randomness distribution values calculated for respective seismic data points in the input data set. More specifically, like the seismic input data set, the randomness estimation values are represented graphically and arranged as a function of time and distance. Additionally, the shading of respective data points in the randomness estimation result image represents the respectively measured value for the randomness seismic attribute as a function of a relative scale (e.g., minimum value to maximum value). The greyscale bar shown in the randomness distribution result image (right) explains the mapping between the seismic attribute value and the corresponding greyscale shading shown in the image.

A comparison of FIGS. 4A-4B illustrates the beneficial results of the Vectorized Disorder Algorithm over the results of the conventional Disorder Algorithm. For example, the Vectorized Disorder Algorithm provides much smoother randomness distribution estimation. Furthermore, as shown in the lower-left corner of the randomness estimation result image (area 405 in the right image in FIG. 4A), the Disorder Attribute gives a falsely high randomness measurement corresponding to the steep structures in the input seismic data image (area 420 in the left image in FIG. 3A), due to the anisotropic nature of Disorder Algorithm. By comparison, falsely high randomness values are not present in the corresponding area of the randomness estimation image (area 415 in the right image in FIG. 3B) generated using the VDA.

As can be appreciated, the processor 100 can be configured to perform various operations in furtherance of seismic exploration as a function of the randomness estimation result generated at step 215. For instance, in an embodiment, the seismic processor 150 can be configured to generate an image representing the randomness estimation result, e.g., the image shown to the right in FIG. 4B, for output to an operator via a display device. The randomness estimation result can also be used to perform further seismic data processing/imaging quality control (QC) on the seismic data so as to generate processed seismic data sets that are more accurate representations of the subsurface region. Such processed data can further be used to generate more accurate seismic images. For instance, the seismic processor 150 can be configured to identify, based on the randomness estimation result, "noisy" data points in the seismic data set, wherein noisy data points are data points that have a calculated level of randomness that exceeds a prescribed threshold value. These noisy data points can be filtered from the seismic data set, thereby enabling the seismic imaging processor 145 to generate a more accurate seismic image from the resulting processed data set. It should be understood that filtering the noisy data points can include excluding those points from the processed data set or otherwise suppressing noisy portions of the data.

In an embodiment, the processor 100 can also be configured to analyze the randomness estimation result and/or processed seismic data or images to detect critical geological features, which could lead to discoveries of new hydrocarbon reservoirs and more efficient production of existing ones. For example, in general, faults and fracture zones exhibit a strong randomness region following linear and belt patterns, respectively. Accordingly, the processor can be configured to detect and correlate these occurrences in the seismic data and seismic attribute data to the respective features. Other geology features can be similarly correlated to other randomness distribution patterns and/or seismic data/image patterns. Furthermore, in an embodiment, the processor 100 can be configured to analyze the processed seismic data/images to make implementation decisions, such as identify locations in the subsurface region of interest for performing subsequent drilling operations using the implementation tool 40. In an embodiment, the processed data/images can also be used for generating subsequent data processing or reservoir modelling workflows.

The terms "a," "an," and "the," as used in this disclosure, means "one or more," unless expressly specified otherwise.

The term "communicating device," as used in this disclosure, means any hardware, firmware, or software that can transmit or receive data packets, instruction signals or data signals over a communication link. The communicating device can include a computer or a server. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, Wi-Fi, WiMAX, IEEE 802.11, DECT, 0G, 1G, 2G, 3G or 4G cellular standards, or Bluetooth.

The terms "computer" or "computing device," as used in this disclosure, means any machine, device, circuit, component, or module, or any system of machines, devices, circuits, components, or modules which are capable of manipulating data according to one or more instructions, such as, for example, without limitation, a processor, a microprocessor, a graphics processing unit, a central processing unit, a general purpose computer, a super computer, a personal computer, a laptop computer, a palmtop computer, a notebook computer, a desktop computer, a workstation computer, a server, a server farm, a computer cloud, or an array of processors, microprocessors, central processing units, general purpose computers, super computers, personal computers, laptop computers, palmtop computers, notebook computers, desktop computers, workstation computers, or servers.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read. The computer-readable medium can include a "Cloud," which includes a distribution of files across multiple (for example, thousands of) memory caches on multiple (for example, thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, Wi-Fi, WiMAX, IEEE 802.11, DECT, 0G, 1G, 2G, 3G, 4G, or 5G cellular standards, or Bluetooth.

The term "database," as used in this disclosure, means any combination of software or hardware, including at least one application or at least one computer. The database can include a structured collection of records or data organized according to a database model, such as, for example, but not limited to at least one of a relational model, a hierarchical model, or a network model. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and their variations, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, or the Internet, any of which can be configured to communicate data via a wireless or a wired communication medium. These networks can run a variety of protocols not limited to TCP/IP, IRC or HTTP.

The term "server," as used in this disclosure, means any combination of software or hardware, including at least one application or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The term "transmission," as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for seismic imaging of a subsurface region of the earth for hydrocarbon exploration, development, or production, the method comprising:
   receiving into a processing system, a set of seismic data measured for the subsurface region;
   measuring, by the processing system from the set of seismic data, a randomness attribute for respective data points in the set of seismic data, wherein the step of measuring the randomness attribute includes:
      performing convolution of a vectorized disorder operator with the set of seismic data, wherein the set of seismic data has a first number of dimensions, wherein the vectorized operator has a second number of dimensions that is one greater than the first number of dimensions, whereby convolution of the seismic data and the vectorized disorder operator generates a vectorized output data set having an extra dimension, n;
   performing a dimension reduction operation on the vectorized output data set to generate a randomness distribution data set having the first number of dimensions, wherein the dimension reduction operation is a nonlinear mathematical operation; and
   generating, by the processing system, a processed seismic data set based on the set of seismic data and as a function of the randomness distribution data set.

2. The method of claim 1, the method further comprising: performing a seismic reflection survey of the subsurface region using seismic sensor equipment to measure the seismic data set.

3. The method of claim 1, the step of generating the processed seismic data set comprising:
   generating, by the processing system, a seismic image, wherein the seismic image is generated based on the set of seismic data and as a function of the randomness distribution data set.

4. The method of claim 1, the step of generating the processed seismic data set comprising:
   identifying, based on the randomness distribution data set, noisy data points within the dataset, wherein the noisy data points are seismic data points having a randomness distribution value that exceeds a prescribed threshold; and
   filtering the noisy data points from the seismic data set.

5. The method of claim 1, wherein the first number of dimensions is at least one.

6. The method of claim 1, wherein the reduction operation is a minimum function applied over the $n^{th}$ dimension of the vectorized output data set.

7. The method of claim 1, wherein for each component of the extra dimension n, the vectorized disorder operator comprises a complete independent operator in a same dimension as the seismic data.

8. The method of claim 1, further comprising generating a visualization of the subsurface region using the processed seismic data set.

9. The method of claim 1, further comprising:
   analyzing, by the processing system, the seismic data and randomness distribution data set for indicators of one or more geologic features of hydrocarbon reservoirs.

10. The method of claim 9, further comprising, extracting natural resources from the subsurface region at a location determined using the processed seismic data set.

11. The method of claim 10, the method further comprising:
   performing a seismic reflection survey of the subsurface region and measuring the set of seismic data using seismic sensor equipment; and
   wherein the step of generating the processed seismic data set includes:
      identifying, based on the randomness distribution data set, noisy data points within the dataset, wherein the noisy data points are seismic data points having a randomness distribution value that exceeds a prescribed threshold,
      filtering the noisy data points from the seismic data set, and
      generating a seismic image based on the processed seismic data set.

12. A system for seismic imaging of a subsurface region of the earth for hydrocarbon exploration, development, or production, the system comprising:

a computing device including:
- a non-transitory storage medium,
- an interface for receiving a set of seismic data measured for the subsurface region, wherein the seismic data has a first number of dimensions,
- a processor, wherein the processor is configured by executing code that is in the form of one or more modules stored in the non-transitory storage medium, wherein the one or more modules configure the processor to:
  - measure, from the set of seismic data, a randomness attribute for respective data points in the set of seismic data, wherein the randomness attribute is measured by:
    - performing convolution of a vectorized disorder operator with the seismic data points, wherein the vectorized operator has a second number of dimensions that is one greater than the first number of dimensions, whereby convolution of the seismic data and the vectorized disorder operator generates a vectorized output data set having an extra dimension, n,
    - performing a dimension reduction operation on the vectorized output data set to generate a randomness distribution data set having the first number of dimensions, wherein the dimension reduction operation is a nonlinear mathematical operation, and
  - generate, a processed seismic data set based on the set of seismic data and as a function of the randomness distribution data set.

13. The system of claim 12, further comprising:
a seismic reflection survey system in communication with the computing device and for performing a seismic reflection survey of the subsurface region and measuring the set of seismic data, the seismic reflection survey system including one or more seismic transducers configured to emit seismic waves into the subsurface region and one or more sensors configured to measure energy reflected from within the subsurface region.

14. The system of claim 13, wherein the computing system further comprises a display device, and wherein the processor is configured to:

generate a seismic image of the subsurface region based on the set of seismic data and as a function of the randomness distribution data set, and output the seismic image using the display device.

15. The system of claim 14, further comprising an implementation tool for hydrocarbon exploration, development or product at a location within the subsurface region identified by the processor from the processed seismic data set.

16. The system of claim 12, wherein the processor is configured to generate the processed seismic data set by:

identifying, based on the randomness distribution data set, noisy data points within the dataset, wherein the noisy data points are seismic data points having a respective randomness distribution value that exceeds a prescribed threshold; and filtering the noisy data points from the seismic data set.

17. The system of claim 16, wherein the processor is further configured to generate a visualization of the subsurface region using the processed seismic data set.

18. The system of claim 12, wherein the reduction operation is a minimum function applied over the $n^{th}$ dimension of the vectorized output data set.

19. The system of claim 12, wherein for each component of the extra dimension n, the vectorized disorder operator comprises a complete independent operator in a same dimension as the seismic data.

* * * * *

UNITED STATES PATENT AND TRADEMARK OFFICE
CERTIFICATE OF CORRECTION

| | | |
|---|---|---|
| PATENT NO. | : 11,740,374 B2 | |
| APPLICATION NO. | : 17/305129 | |
| DATED | : August 29, 2023 | |
| INVENTOR(S) | : Qiang Fu and Saleh A. Dossary | |

It is certified that error appears in the above-identified patent and that said Letters Patent is hereby corrected as shown below:

In the Specification

Column 6, Line 38 should read:
As can be appreciated combining the Disorder and smooth operators, the resultant operator is equal to splitting the Disorder operator into four pieces and then stretching them into its four corners as shown in FIG. 5B.

Signed and Sealed this
Tenth Day of October, 2023

*Katherine Kelly Vidal*

Katherine Kelly Vidal
*Director of the United States Patent and Trademark Office*